United States Patent [19]

Hunold et al.

[11] 4,381,931
[45] May 3, 1983

[54] PROCESS FOR THE MANUFACTURE OF SUBSTANTIALLY PORE-FREE SHAPED POLYCRYSTALLINE ARTICLES BY ISOSTATIC HOT-PRESSING IN GLASS CASINGS

[75] Inventors: Klaus Hunold, Kempten; Klaus Reinmuth, Durach; Alfred Lipp, Bad Worishofen, all of Fed. Rep. of Germany

[73] Assignee: Elektroschmelzwerk Kempten GmbH, Munich, Fed. Rep. of Germany

[21] Appl. No.: 304,948

[22] Filed: Sep. 23, 1981

[30] Foreign Application Priority Data

Oct. 29, 1980 [DE] Fed. Rep. of Germany ....... 3040771

[51] Int. Cl.$^3$ .............................................. B22F 3/14
[52] U.S. Cl. ..................................... 65/18.1; 51/308; 51/309; 65/18.2; 264/65; 419/2
[58] Field of Search ...................... 65/18.1, 18.2, 18.3; 264/65; 51/308, 309; 75/223, 225, 226

[56] References Cited

U.S. PATENT DOCUMENTS

| 3,954,930 | 5/1976 | Vasilos et al. .......................... 264/65 |
| 3,992,200 | 11/1976 | Chandhok .......................... 75/226 X |
| 4,081,272 | 3/1978 | Adlerborn . |
| 4,112,143 | 9/1978 | Adlerborn et al. .................... 264/65 |
| 4,227,927 | 10/1980 | Black ................................. 75/223 X |
| 4,242,294 | 12/1980 | Hüther et al. . |

FOREIGN PATENT DOCUMENTS

| 2327273 | 1/1974 | Fed. Rep. of Germany . |
| 2601294 | 8/1976 | Fed. Rep. of Germany . |
| 2737208 | 2/1979 | Fed. Rep. of Germany . |
| 2950158 | 7/1980 | Fed. Rep. of Germany . |
| 3009240 | 10/1981 | Fed. Rep. of Germany . |
| 54-114510 | 9/1979 | Japan ..................................... 65/18.3 |
| 55-62102 | 5/1980 | Japan ..................................... 75/223 |
| 1426619 | 3/1976 | United Kingdom . |
| 1488762 | 10/1977 | United Kingdom . |
| 2048952 | 12/1980 | United Kingdom . |
| 2062011 | 5/1981 | United Kingdom . |

*Primary Examiner*—Arthur D. Kellogg
*Attorney, Agent, or Firm*—Burgess, Ryan and Wayne

[57] ABSTRACT

The invention relates to a process for the manufacture of substantially pore-free shaped articles of polycrystalline material such as aluminium oxide, titanium boride, silicon nitride or silicon carbide, in which pulverulent materials or preformed articles having pores open towards the surface, in a vacuum-tight sealed glass casing that has a viscosity of less than $10^6$ Pas at the pressing temperature employed, are isostatically hot-pressed in a high-pressure autoclave using an inert gas as pressure-transfer medium. By being embedded in a flowable pile or by having a layer applied to them in the form of a suspension, the glass-encased powders or articles are brought into contact with a heat-resistant pulverulent material that, upon softening of the glass casing, penetrates into the surface of the glass or reacts with it, with the result that the glass casing is reinforced from the outside at the pressing temperature. As pulverulent materials, there may be used titanium boride, graphite, SiC or boron nitride, which do not react with the glass casing, or glass powder or silica, which react with the glass casing to form a glass melt of at least the same viscosity as, or of a higher viscosity than, the glass casing.

8 Claims, No Drawings

PROCESS FOR THE MANUFACTURE OF SUBSTANTIALLY PORE-FREE SHAPED POLYCRYSTALLINE ARTICLES BY ISOSTATIC HOT-PRESSING IN GLASS CASINGS

The invention relates to a process for the manufacture of substantially pore-free shaped articles of polycrystalline material, in which pulverulent materials per se or articles preformed therefrom that have pores open at the surface are isostatically hot-pressed in a vacuum-tight sealed casing of glass in a high-pressure autoclave using an inert gas as pressure-transfer medium.

BACKGROUND OF THE INVENTION

It is known that preformed articles of pulverulent materials can be highly densified or post-densified by isostatic hot-pressing to produce substantially pore-free shaped polycrystalline articles the density of which may reach 100% of the theoretical density.

If the pulverulent materials per se or articles preformed therefrom having open pores, that is to say, having pores open at the surface, are subjected to an isostatic hot-pressing operation, it is necessary to provide them with a gas-tight casing to prevent the gas used as pressure-transfer medium from penetrating and interfering with densification.

The so-called glass-capsule technique was developed for that purpose. According to that technique, for example, pulverulent materials per se are placed in prefabricated glass capsules or glass containers the internal dimensions of which correspond approximately to the desired shape of the finished shaped article, the choice of the glass being dependent on the temperature required for densifying the powders. The glass containers filled with the powder are evacuated and sealed gas-tight. The sealed containers, preheated to deformation point to reduce shock, are introduced into a hot molten-salt bath and subsequently heated under pressure to the required temperature at which the powder densifies and the container becomes soft (see DEPS 19 01 766, which corresponds to U.S. Reissue Pat. No. 28,301).

Preformed articles having open pores also can be placed in prefabricated glass capsules that do not have to be exactly adapted to the dimensions of the article (see DE-AS No. 23 46 499, which corresponds to British Patent No. 1,441,330, and DE-OS No. 25 48 740, which corresponds to British Patent No. 1,522,705), it being possible additionally to fill the space between the glass capsule and the preformed article with a glass powder that has a higher softening temperature than that of the capsule itself (see DE-AS No. 26 01 294, which corresponds to British Pat. No. 1,529,966). Before being introduced into the isostatic hot press, the capsules and their contents are evacuated and then sealed gastight. During the heating-up process in the high pressure autocalve, the glass capsules and the optionally present glass powder soften and, due to the acting gas pressure, conform to the dimensions of the preformed article.

Instead of being introduced into prefabricated glass capsules, preformed articles can be coated directly with a glass or vitreous paste, for example, by flame-spraying or plasma-spraying or by dipping, to form a porous surface layer, which is then fused by heating under reduced pressure to form a gas-tight casing (see DE-AS No. 22 08 250, which corresponds to British Pat. No. 1,374,033). In the case of preformed articles that require a high densification temperature, the casing produced must consist of a high-melting vitreous paste to prevent the casing from running off prematurely or penetrating into the article. This has the disadvantage, however, that the surface layer becomes gas-tight only at a fairly high temperature.

A process has been developed for preformed articles that require a high densification temperature, for example, those consisting of silicon nitride, in which two porous layers are applied to the preformed article, an inner layer being applied directly to the article, consisting of a high-melting glass-forming material and the outer layer consisting of a lower-melting glass-forming material. First, the outer layer is melted gas-tight by heating under reduced pressure, and then pressure is applied with increasing temperature so that, before reaching and while maintaining the required densification temperature, the article is always enclosed by a gas-tight casing (see DE-OS No. 27 02 073, which corresponds to U.S. Pat. No. 4,112,143).

Since, however, such glass encapsulation techniques obviously do not bring about a tight enclosure of the preformed article, methods have been devised in which the escape of gases from the pulverulent article during the formation of the casing is prevented by controlling the gas pressure during the conversion of the gas-permeable casing into a casing that is not permeable to the pressure medium (see DE-OS No. 29 15 831, which corresponds to British Patent No. 2,024,256A, and DE-OS No. 29 16 223, which corresponds to British Pat No. 2,024,255A).

In all cases where the so-called glass capsule technique is used, irrespective of whether prefabricated glass capsules are used or the glass casing is produced on the article, there is nevertheless always the danger that the glass casing will run off prematurely. The flow of the glass casing cannot be eliminated by known measures.

For materials that require high densification temperatures, that is to say, temperatures greater than 700° C., the types of glass having the highest softening temperatures such as silica glass, cannot be used as casing materials under certain conditions. In the manufacture of very small shaped articles, the glass casing can be prevented from completely running off at high temperatures for a relatively long time by the supportive effect of the glass that has already run off. In that case, the shaped article is coated at its upper end with only a thin skin of glass whereas the lower end is embedded in a thick layer of glass which prevents uniform densification. In the case of large shaped articles, on the other hand, the glass casing runs off almost completely.

BRIEF DESCRIPTION OF THE INVENTION

The object of the invention is therefore to provide a process for the manufacture of substantially pore-free shaped polycrystalline articles from pulverulent materials or from articles preformed therefrom that have pores open at the surface, in a vacuum-tight sealed glass casing, by isostatic hot-pressing in a high-pressure autoclave using an inert gas as pressure-transfer medium, in which process, running-off of the glass casing is substantially reduced.

This object is achieved according to the invention, in that the glass-encased powders or articles are brought into contact with a heat-resistant pulverulent material that is permeable to the pressure-transfer medium and penetrates into the surface of the glass or reacts with it when the glass casing softens during the heating-up operation in the isostatic hot-pressing process with the result that the glass casing is reinforced from the outside at the pressing temperature employed.

Accordingly, in the process according to the invention, to prevent the glass casing from flowing off at low viscosity, the casing is reinforced or supported from the outside, so that the powder or preformed article to be densified is enclosed in a gas-tight manner by a casing layer of uniform thickness during the entire hot-pressing operation.

DETAILED DESCRIPTION OF THE INVENTION

According to the process of the invention, it is possible to densify, by means of the hot isostatic technique, pulverulent materials per se or articles preformed therefrom which are difficult to densify by known methods. Materials which are so treated include compositions such as metals, metallic and non-metallic refractory (mechanically resistant) materials, for example, borides, carbides, nitrides and/or silicides, optionally in combination with known binder metals and/or sintering aids. When using preformed articles, the articles can be shaped by conventional known measures, for example, by die pressing, isostatic pressing, injection molding, extrusion or slip casting, at room temperatures or at elevated temperature, by pressureless sintering or simple hot-pressing. After shaping, the preformed articles should have a density of at least 50%, preferably at least 60% of the theoretical density.

When using pulverulent materials per se, prefabricated glass capsules are required for the glass casing. The composition of the glass is chosen according to the required densification temperature. Prefabricated glass capsules can also be used for densifying preformed articles. The preformed articles can, however, alternatively be coated according to one of the known processes, with a glass or vitreous paste which is subsequently fused gas-tight. Examples of such pastes are low-melting borosilicate glasses, aluminosilicate glasses, high-melting, so-called Vycor glasses (approximately 96% $SiO_2$+3% $B_2O_3$) and pure silica glass, which are advantageously applied in the form of an aqueous glass powder suspension together with an organic binder, such as polyvinyl alcohol or stearic acid, by customary means such as dipping, spraying, syringeing, brushing or painting.

When using preformed articles, it is also advantageous to apply an intermediate layer between the glass casing and the article. When using prefabricated glass capsules, inert powders such as boron nitride or foils, such as graphite foils, can be used as an intermediate layer.

If, on the other hand, the glass casing is produced by coating a preformed article with a glass or vitreous composition, it has proved especially advantageous to use intermediate layers comprising an organic material that can be decomposed or melted at temperatures of up to approximately 400° C. under normal pressure, such as an organic wax or a resinous product, or a heat-resistant material that can be compressed to at least half its volume, such as fibers or felts of aluminium oxide, carbon, graphite or boron nitride, according to the process described in U.S. Ser. No. 238,106.

According to the present invention, the glass-encased powders or articles are sealed vacuum-tight and brought into contact with the pulverulent material, which, according to the definition, must be heat-resistant and permeable to the gaseous pressure-transfer medium.

For this purpose, the glass encased specimens can be embedded in a flowable mass of the pulverulent material in the high-pressure autoclave, which can be achieved, for example, by heaping the pulverulent material loosely over the glass-encased specimens and completely covering them. To ensure complete coverage of the glass encased specimens by the flowable pulverulent material, the flowable pulverulent material can be accomodated in a vessel that does not hinder the free passage of the gaseous pressure-transfer medium. Since only the powder particles which directly contact the surface of the glass are active in supporting the glass casing upon softening, the powder must be able to flow upon compressing the glass casing in order to ensure that the entire surface of the glass casing is always in contact with the powder during the hot-pressing operation. Relatively coarse powders having particle sizes of from about 0.1 to 3 mm., more suitably from about 0.1 to 1 mm, that also remain readily flowable at elevated temperature, have proved especially useful for this purpose.

Instead of introducing the glass-encased specimens into a flowable heap or mass of pulverulent material, it is possible alternatively to apply to the glass-encased specimens, before they are introduced into the high-pressure autoclave, a layer of the pulverulent material in the form of a suspension, for example, in water or in an organic solvent such as acetone or an aliphatic alcohol having from 1 to 6 carbon atoms, which is subsequently dried to form a layer having a thickness of from about 0.1 to 3 mm, more suitably from 0.3 to 1 mm. To insure good adhesion of the powder layer, the surface of the glass can be roughened, for example by sand blasting, before applying the suspension. Since, when using this method, subsequent settling of the powder around the article is not necessary, finer powders, having particle sizes in the range of from about 0.5 to 100 $\mu$m, more suitably from about 1 to 30 $\mu$m, can be used for this purpose. The glass-encased samples so covered are then introduced into the high-pressure autoclave.

Irrespective of the particular means by which the pulverulent material is brought into contact with the glass-encased specimens, the pulverulent material can fulfill its function, namely, to reinforce the glass casing from the outside at the pressing temperature employed, and thereby prevent the glass-casing from flowing off because of low viscosity. The pulverulent material reinforces the glass surface either by penetrating into the glass surface or reacting with the glass surface during the heating-up process in isostatic hot-pressing.

By pulverulent materials that penetrate into the surface of the glass casing and reinforce the same, it is to be understood such materials include those which, at the pressing temperature employed, neither melt nor sinter and which do not react with the actual glass casing. Examples of such materials are high-melting point metals such as molybdenum, tungsten and tantalum; intermetallic compounds such as titanium diboride, graphite, and nonoxidic ceramic materials such as silicon carbide, silicon nitride, boron carbide and boron nitride. The pulverulent materials can be used individually or in admixture with one another. Reinforcement of the glass casing is achieved as a result of the incorporation of the solid powder particles into the molten glass casing. The solid particles are inert at the pressing temperature employed and provide reinforcement which is roughly comparable to the reinforcing action of an inert filler. Since, as a result of the pressure of the gaseous pressure-transfer medium, the glass casing is simultaneously pressed tightly against the powder or preshaped articles which are to be densified, running off of the glass casing towards the interior is not possible and the uniformly thick casing layer is maintained.

Pulverulent materials which react with the surface of the glass casing and reinforce the same, are those which combine with the glass casing by means of a molten phase to form a glass melt of at least the same viscosity or a higher viscosity than that of the actual glass casing. Examples of these are oxidic ceramic materials, glass powders or glass-forming raw materials, individually or in admixture. The choice of these powders depends on the softening temperature, or the viscosity at the pressing temperature of the glass casing. For glass casings having a low softening temperature such as a soda-lime glass, aluminium oxide powder, for example, can be used. Other examples of powders that can be used to reinforce glass casings having a low softening temperature are powders of silica glass, aluminosilicate glass or borosilicate glass, or powders of oxides and oxide mixtures which form such types of glass. For glass casings having a high softening temperature such as silica glass, on the other hand, only silica glass powder or pure silica powders can be used.

When using pulverulent materials of the type that react with the surface of the glass casing, the best results are obtained by embedding the glass-encased specimens in a flowable pile of the powder. In this case, the gaseous pressure-transfer medium can penetrate into the voids in the pile, thus directly transferring pressure to the glass casing. When the powder melts, the permeability of the pile is lost. However, a glass melt that is interspersed with a large number of bubbles is produced, that is, a kind of glass foam is formed which subsequently transfers the gas pressure to the glass casing. It is advantageous in this case to regulate the temperature and the pressure separately that is, to apply the gas pressure only upon softening of the glass casing. As a result, the internal gas pressure in the bubbles that are forming in the glass foam is approximately the same as the external gas pressure. This prevents the bubbles from being compressed by the high external pressure and the foam from prematurely collapsing.

With these conditions being maintained, the foam formed is generally stable up to a viscosity of the glass melt of approximately $10^2$ Pas, the glass melt fuses with the glass casing so that reinforcement of the glass casing, which usually begins to run off at a viscosity of $10^6$ Pas, is achieved as a result of the supporting action of the glass foam.

The stability of the glass foam formed depends on the number of bubbles formed and their size that is, the greater the number of bubbles and the smaller the bubbles, the more stable is the glass foam. This object is advantageously achieved by selecting a narrow particle size distribution in the powder used.

When the hot isostatic densification of the glass-encased specimens is complete, it is advantageous to control pressure and temperature separately that is, to reduce the gas pressure only when the glass foam has solidified, which generally takes place at a viscosity of the glass of approximately $10^{13}$ Pas. As a result, due to the high internal pressure of the bubbles in the glass foam, the latter is cracked off together with the glass casing so that the polycrystalline articles densified by the hot-isostatic technique can be readily separated from the glass casing.

By means of the process according to the invention, it is possible, for the first time, to subject pulverulent materials that require high densification temperatures greater than 1700° C. such as silicon nitride or especially silicon carbide, to the isostatic hot-pressing operation in a simple manner in a high-melting glass casing of silica glass. Uniform densification of the shaped polycrystalline article is achieved irrespective of its shape and size, which, hitherto in the case of silicon carbide, using densification temperatures of at least 1900° C., was totally impossible or, in the case of silicon nitride, using densification temperatures of at least 1750° C., was to be achieved, at best, by expensive measures.

The process according to the present invention is equally suitable, however, for pulverulent materials that require lower temperatures for complete densification such as titanium boride or aluminium oxide, and which, accordingly, can be isostatically hot-pressed in glass casings having a lower softening point which can be worked more easily and are also less expensive.

The process according to the present invention can therefore be applied universally, that is to say, the reinforcement of the glass casings from the outside can be achieved in all types of glass that have a viscosity of less than $10^6$ Pas at the pressing temperature employed.

The process according to the invention is described in detail in the following examples.

EXAMPLE 1

(a) Cylinders 40 mm in diameter and 60 mm in length, were manufactured by isostatic pressing at room temperature from pulverulent $Al_2O_3$ containing 1% by weight of MgO as a sintering aid; density 2.06 g/cm$^3$ = 51.5% of the theoretical density. The cylinders were placed in a preformed casing of aluminosilicate glass (57.5% by weight of $SiO_2$, 20% by weight of $Al_2O_3$, 9% by weight of $B_2O_3$, 8% by weight of MgO, 5% by weight of CaO, 0.5% by weight of $Na_2O$). Pure BN powder (particle size 40–100 μm) was introduced as a layer between the casing and the cylinder and the casing was sealed gas-tight in vacuo.

(b) An encased cylinder manufactured as described in (a) was placed in a graphite crucible, the base of which was covered with a layer of BN powder 5 mm in depth. The crucible was then filled with BN powder so that the encased specimen was completely covered. The particle size of the BN powder was from 0.1–0.5 mm. The crucible was placed in a high-pressure autoclave and heated to 1000° C. in vacuo over a period of 30 minutes. The temperature and argon gas pressure were then increased simultaneously. The final temperature of 1550° C. was maintained for 2 hours at a gas pressure of 1500 bar. The temperature and pressure were subsequently reduced simultaneously so that, at 800° C. the gas pressure was only 20 bar, and the apparatus was then switched off. The shaped article, cleaned by sand blasting, had a density of 3.96 g/cm$^3$ which is approximately 99% of the theoretical density.

(c) An encased cylinder manufactured as described in (a) was placed in a graphite crucible the base of which was covered with a layer of silica glass powder approximately 5 mm in depth. The crucible was then filled with silica glass powder so that the encased specimen was completely covered. The particle size of the silica glass powder was 0.8–1 mm. The crucible was placed in a high pressure autoclave and heated to 1000° C. in vacuo over a period of 30 minutes. The argon gas pressure was increased to 1500 bar until a temperature of 1300° C. was reached, and then the temperature was increased to 1550° C. and maintained for 2 hours. The apparatus was subsequently cooled to 800° C. and only then was the remaining pressure released and the apparatus switched off. The shaped article, cleaned by sand blasting, had a density of 3.98 g/cm$^3$ that is, 99.5% of the theoretical density.

EXAMPLE 2

(a) Cubes having an edge length of 40 mm and a density of 1.92 g/cm$^3$, corresponding to approximately 59.8% of the theoretical density, were manufactured by isostatic pressing at room temperature from pulverulent α-SiC containing 1.5% by weight of aluminium as a sintering aid. The cubes were placed in a preformed casing of silica glass which was provided with an intermediate layer consisting of a 1 mm thick graphite foil and the casing was sealed gas-tight in vacuo.

(b) An encased cube manufactured as described in (a) was placed in a graphite crucible the base of which was covered with a layer of SiC powder 5 mm in depth. The crucible was then filled with SiC powder so that the encased specimen was completely covered. The particle size of the SiC powder was from 0.3 to 0.5 mm. The crucible was placed in a high-pressure autoclave and heated to 1300° C. in vacuo over a period of 40 minutes. The temperature and argon gas pressure were then increased simultaneously. The final temperature of 1900° C. was maintained for 3 hours at a gas pressure of 2000 bar. The temperature and pressure were subsequently reduced simultaneously so that at 1300° C., a gas pressure of only 20 bar remained, and the apparatus was switched off. The shaped article, cleaned by sand blasting, had a density of 3.18 g/cm$^3$ which is approximately 99.1% of the theoretical density.

(c) An encased cube manufactured as described in (a) was placed in a graphite crucible the base of which was covered with a 5 mm deep layer of quartz chips. The crucible was then filled with quartz chips so that the encased specimen was completely covered. The particle size of the quartz chips was from 0.5 to 1 mm. The crucible was placed in a high-pressure autocalve and heated to 1300° C. in vacuo over a period of 40 minutes. The argon gas pressure was increased to 2000 bar until a temperature of 1600° C. was reached and then the temperature was increased to 1900° C. and maintained for 3 hours. After cooling the apparatus to 1200° C., the remaining gas pressure was released and the apparatus was switched off. The shaped article, cleaned by sand blasting, had a density of 3.19 g/cm$^3$ which is approximately 99.4% of the theoretical density.

EXAMPLE 3

(a) Cylinders 30 mm in diameter and 70 mm in length were manufactured by isostatic pressing at room temperature from pulverulent Si$_3$N$_4$ containing 3% by weight of MgO as a sintering aid; density: 1.98 g/cm$^3$ which is approximately 62% of the theoretical density. A first layer of paraffin wax of 1 mm thickness was applied to the cylinders by dipping them into a wax melt and onto that was painted a second layer of 1 mm thickness of a suspension of a Vycor glass powder (97% by weight of SiO$_2$, 3% by weight of B$_2$O$_3$). The wax was subsequently melted out through the porous glass powder in a box furnace.

(b) A cylinder manufactured as described in (a) was placed in a graphite crucible the base of which was covered with a 5 mm deep layer of a BN-SiC powder mixture. The crucible was then filled with the BN-SiC powder mixture so that the encased cylinder was completely covered. The particle size of the SiC powder was from 0.3 to 0.6 mm and that of the BN powder was from 0.1 to 0.5 mm. The powders were mixed in a ratio of 1:1. The crucible was placed in a high-pressure autoclave and heated to 1200° C. in vacuo over a period of 40 minutes. After a dwell time of 2 hours for the casing to melt and seal tightly, the temperature and pressure were simultaneously increased to 1750° C. and 2000 bar for a further dwell time of 4 hours, after which the temperature and pressure were simultaneously reduced so that, at 1050° C., a gas pressure of only 20 bar remained and the apparatus was switched off. The shaped article, cleaned by sand blasting, had a density of 3.19 g/cm$^3$ which is approximately 100% of the theoretical density.

(c) A cylinder manufactured as described in (a) was placed in a graphite crucible the base of which was covered with a 5 mm deep layer of silica glass powder. The crucible was then filled with silica glass powder so that the encased specimen was completely covered. The particle size of the silica glass powder was from 0.8 to 1 mm. The crucible was placed in a high-pressure autoclave and heated to 1200° C. in vacuo over a period of 40 minutes and maintained at that temperature for 2 hours. The argon gas pressure was increased to 2000 bar until a temperature of 1300° C. was reached and then the temperature was increased to 1750° C. and maintained for 2 hours. After cooling the apparatus to 1050° C., the remaining pressure was released and the apparatus was switched off. The shaped article, cleaned by sand blasting, had a density of 3.18 g/cm$^3$ which is approximately 99.7% of the theoretical density.

EXAMPLE 4

A TiB$_2$ powder without additives was placed in a tube of Vycor glass which was closed at one end and lined with a 1 mm thick graphite foil. The powder was then covered with a graphite foil and the casing sealed gas-tight in vacuo. The internal dimensions of the glass tube were 50 mm in diameter and 250 mm in length. The outer surface of the glass casing was roughened by sand blasting and a TiB$_2$ layer of approximately 0.3 mm thickness consisting of a suspension of TiB$_2$ powder with acetone was sprayed thereon. The particle size of the TiB$_2$ powder was 20 μm and finer. The specimen was placed in a graphite tube in a high-pressure autoclave and heated to 1200° C. in vacuo. The temperature and argon gas pressure were subsequently increased simultaneously so that, at 1700° C., the pressure was 2000 bar. After a dwell time of 2 hours, the temperature and pressure were reduced to 1050° C. and 20 bar gas pressure, and the apparatus was switched off. The rod, cleaned by sand blasting, had a density of 4.46 g/cm$^3$ which is approximately 99.1% of the theoretical density.

We claim:

1. In a process for the manufacture of substantially pore-free shaped polycrystalline articles from pulverulent material or from articles preformed therefrom that have pores open at the surface, by isostatic hot-pressing, the article being sealed under vacuum in a glass casing, in a high pressure autoclave using an inert gas as a pressure-transfer medium, the improvement which comprises contacting the glass-encased powders or articles with a heat-resistant pulverulent material which is permeable to the pressure-transfer medium and which penetrates into the surface of the glass or reacts with it when the glass casing softens during the heating-up operation in the isostatic hot-pressing process, whereby the glass casing is reinforced from the outside at the isostatic pressing temperature.

2. A process according to claim 1 wherein the glass-encased powders or articles are embedded in a pile of flowable pulverulent material.

3. A process according to claim 1 wherein a layer of the pulverulent material is applied to the glass-encased powders or articles.

4. A process according to claim 3 wherein the layer of pulverulent material is applied as a suspension and dried.

5. A process according to claim 1 wherein a pulverulent material that does not react with the glass casing at the pressing temperature employed is used.

6. A process according to claim 5 wherein high-melting point metals, intermetallic compounds, graphite or nonoxidic ceramic materials, individually, or in admixture, are used as the pulverulent material.

7. A process according to claim 1 wherein a pulverulent material is used which reacts with the glass casing at the pressing temperature to form a glass melt of at least the same viscosity as that of the glass casing.

8. A process according to claim 7 wherein oxidic ceramic materials, glass powders or glass-forming raw materials, individually or in admixture, are used as the pulverulent material.

* * * * *